United States Patent
Sahay et al.

(10) Patent No.: US 6,623,239 B2
(45) Date of Patent: Sep. 23, 2003

(54) TURBOCHARGER NOISE DEFLECTOR

(75) Inventors: Sunil Nandan Sahay, Rolling Hills Estates, CA (US); Daniel Volle Brown, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/013,608

(22) Filed: Dec. 10, 2001

(65) Prior Publication Data

US 2002/0071765 A1 Jun. 13, 2002

Related U.S. Application Data

(60) Provisional application No. 60/255,656, filed on Dec. 13, 2000.

(51) Int. Cl.[7] .............................................. F01D 25/04
(52) U.S. Cl. ..................... 415/119; 415/58.4; 415/116; 415/145; 415/11
(58) Field of Search ..................... 415/119, 58.1, 415/58.2, 58.3, 58.4, 58.5, 58.6, 58.7, 116, 914, 11, 145, 206; 417/407

(56) References Cited

U.S. PATENT DOCUMENTS

| | | | |
|---|---|---|---|
| 4,743,161 A | * | 5/1988 | Fisher et al. ............... 415/53 R |
| 4,930,979 A | * | 6/1990 | Fisher et al. ............... 415/58.4 |
| 5,246,335 A | | 9/1993 | Mitsubori et al. |
| 5,295,785 A | | 3/1994 | Church et al. |
| 5,399,064 A | | 3/1995 | Church et al. |
| 5,863,178 A | * | 1/1999 | Scheinert et al. .......... 415/58.4 |

FOREIGN PATENT DOCUMENTS

| | | |
|---|---|---|
| DE | 4212 653 A1 | 10/1992 |
| DE | 197 27 139 A1 | 1/1999 |
| EP | 0913585 A1 | 5/1999 |
| GB | 2256460 A | 12/1992 |

* cited by examiner

Primary Examiner—Edward K. Look
Assistant Examiner—James M McAleenan
(74) Attorney, Agent, or Firm—Ephraim Starr

(57) ABSTRACT

A turbocharger having a bypass port compressor, with a center channel that flows directly into the compressor wheel, and an annular channel which acts as a bypass and provides flow either into or out of the compressor wheel, with an inner deflector having at least a first surface substantially perpendicular to the annular channel and extending radially into the annular channel, and at least a second surface substantially parallel to the annular channel and extending axially along the annular channel, such that line-of-sight transmission of sound from the annular channel is eliminated, and sound waves are instead dampened or canceled, reducing noise emissions from the compressor.

22 Claims, 2 Drawing Sheets

TURBOCHARGER NOISE DEFLECTOR

CROSS REFERENCE TO RELATED APPLICATIONS

This application claims the priority of copending application Ser. No. 60/255,656 filed on Dec. 13, 2000 having the same title as the present application.

FIELD OF THE INVENTION

The present invention relates to devices used for reducing noise emissions in turbocharger systems, and more specifically, to a compressor inlet configuration that is used to reduce noise in a turbocharger.

BACKGROUND OF THE INVENTION

The use of turbochargers to increase the intake air pressure of internal combustion engines is a common, well known means to increase engine output. A turbocharger system typically comprises a turbine wheel and a compressor wheel, often mounted on a common shaft, and disposed within respective housings of the turbocharger. The exhaust generated by an internal combustion engine is routed to the turbine, where the exhaust is used to drive a turbine wheel. The turbine wheel is generally an impeller, having blades or vanes. The turbine wheel turns a shaft, which is coupled, directly or indirectly, to a compressor wheel, that is also generally a bladed impeller type of wheel. The compressor wheel draws in intake air, compresses it, and supplies the air to the internal combustion engine. In many conventional turbochargers the compressor wheel is driven at high speeds or revolutions per minute. Many turbine wheels (and thus compressor wheels) rotate at a speed in the range of 100,000 to 150,000 revolutions per minute. This high speed rotation of the turbine and compressor wheels causes the turbine and compressor blades to generate high levels of noise, known as Blade Pass Frequency noise, or sometimes informally referred to as turbo whine.

To increase the performance of compressors in such systems, a bypass port is often added to the main compressor inlet, typically utilizing a ported shroud configuration. While a typical compressor generally has a single inlet to the compressor wheel, defined by the housing of the compressor, the ported shroud or bypass port provides an inlet with inner and outer portions. Typically, a ported shroud compressor has a housing similar to previously known compressors, with the housing defining a compressor inlet and outlet, but also having an additional wall. In a typical bypass port configuration such as the ported shroud, the compressor wheel is mounted in a central portion of the compressor housing, defined by an additional cylindrical inner wall inside the compressor housing which forms a shroud within the outer wall of the compressor housing. This inner wall extends beyond the compressor wheel, but does not extend as far outward as the housing of the compressor. An outer portion of the inlet is defined within the compressor housing, extending inward from the end of the housing to the end of the cylindrical inner wall. At that point, the outer portion of the inlet is adjacent to the inner portion of the inlet. The inner portion of the inlet has a central channel, defined within the inner surface of the inner wall or shroud, and providing a path to the face of the compressor wheel. The inner portion of the inlet also has an annular channel defined between the inner surface of the compressor housing and the outer surface of the inner wall (the shroud). The annular channel runs from the outer portion of the inlet to the vanes or blades of the compressor wheel.

The addition of a bypass port increases the operating range of a compressor. Typically, a compressor's operating range is limited at low speeds by a phenomena referred to in the industry as "surge," where the volume of air provided to the compressor exceeds the system's requirements, and limited at high speeds by a phenomena referred to in the industry as "choke," where the system's air requirements exceed the compressor's maximum flow rate. The annular channel, or port, in communication with the compressor wheel acts as a bypass. At low speeds, which might otherwise cause a surge condition, the port allows flowback from the compressor wheel to the main inlet, allowing the system to reach equilibrium. At high speeds, which might otherwise cause a choke condition, the port allows extra air to be drawn directly into the blades of the compressor wheel. Compressors configured with this type of inlet are sometimes known as "map width enhanced" compressors.

However, the performance improvements of this type of compressor come at the cost of increased noise. The port, or bypass, provides a direct path to the compressor wheel, and thus provides a means for the noise (sound waves) generated by the high speed revolutions of the compressor wheel to exit the compressor housing. One method of addressing this situation is by placing baffles along the annular channel, creating a "torturous" path for the air and sound waves to traverse. Another method used has been to insert a conical baffle in the outer portion of the inlet of the compressor. Although these methods provide some measure of noise reduction, further noise reduction is required, and at a lower cost. Thus, there exists the need for an economical device to reduce noise transmission from a shrouded compressor, and which may be used in a range of shrouded compressor configurations.

SUMMARY OF THE INVENTION

The present invention provides an economical device for reducing noise emissions from a turbocharger bypass port compressor. The device comprises an annular inner deflector for attachment in the first portion of the inlet of a ported shroud compressor. A secondary noise suppressor may also be used in conjunction with the inner deflector to further reduce noise transmission.

The inner deflector is a ring-shaped device with several noise blocking surfaces. A simple approximation of its shape would be to take a circle and extrude it over a "J" or "L" shaped path. A first surface is substantially parallel to the walls and flow of the bypass port, and provides the point of attachment to a wall of the bypass port. A second surface is substantially perpendicular to the first surface, and substantially perpendicular to the flow within the bypass port. This second surface prevents unobstructed flow of noise through the bypass by blocking the linear or "line of sight" flow of sound waves. A third surface, substantially parallel to the first surface and the walls of the bypass port, and substantially perpendicular to the second surface, acts to further contain sound waves, and to dampen the intensity of the waves, thus further reducing noise transmission. The planar blocking surfaces disrupt "line of sight" transmission of sound waves from the compressor wheel, forcing the sound waves to travel a longer path, losing some energy along the way. In addition, some noise reduction occurs due to the canceling effects of sound waves colliding along the path defined by the inner wall and the inner deflector. The positioning of the inner deflector, as well as the lengths of the various surfaces of the inner deflector, are dependant on the type of application, and may be varied to achieve maximum noise reduction, considering all factors such as frequency, reflection, resonance, and cancellation of the sound waves.

A secondary noise suppressor ring further reduces noise transmission by increasing the length of the path that the sound waves must travel to escape the compressor, thus experiencing attenuation of the sound wave.

An additional advantage of the present invention is that the inner deflector no longer must be matched to the trim size of each compressor wheel, thereby reducing the cost of producing inner deflectors, and increasing the range of use for the deflector. Thus the tooling cost for reducing noise on ported shroud compressor stage turbochargers is reduced.

DETAILED DESCRIPTION OF THE INVENTION

Figure 1:
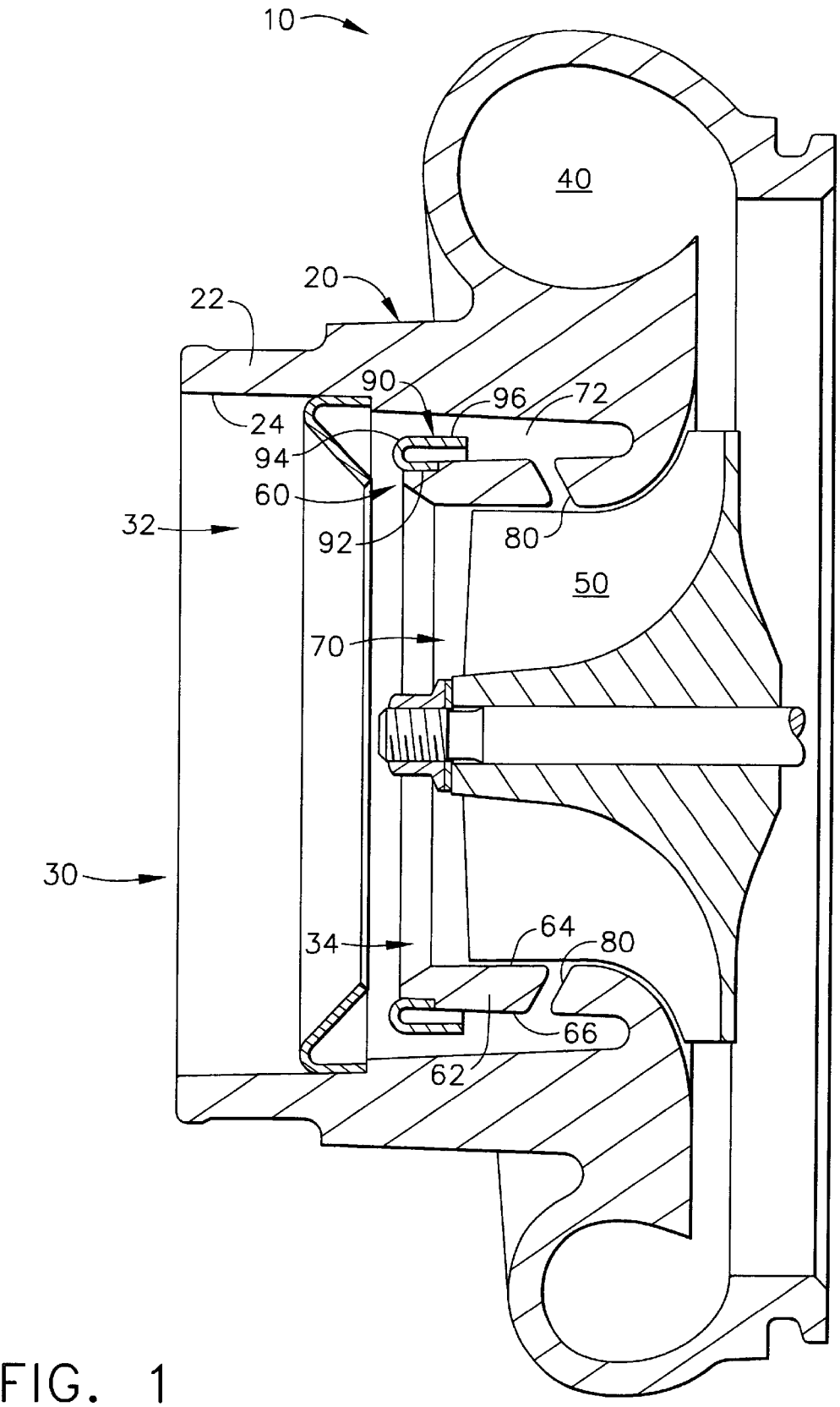
FIG. 1 is a cross-sectional elevation view of a ported shroud compressor in accordance with one embodiment of the present invention.

Referring to FIG. 1, a turbocharger ported shroud compressor 10 is provided. The compressor has a housing 20, with an outer wall 22 defining an inlet 30. The inlet has an outer portion 32, and an inner portion 34. The outer portion 32 is defined by a wall 22 of the housing. The wall 22 has an inner surface 24. The compressor housing 20 further defines an outlet 40. Within the outer wall 22 of the housing is a shroud 60, defined by an inner compressor wall 62. This inner wall has an inner surface 64, and an outer surface 66. In one embodiment, the outer wall 22 defined by the housing is circular, and the shroud is defined by the circular inner wall 62 concentric to the outer wall.

A compressor wheel 50 is rotatably mounted within the shroud. In one embodiment, the compressor wheel is comprised of a plurality of vanes or blades. The compressor wheel is located such that the inner surface 64 of the shroud is adjacent to the blades of the compressor wheel. The wheel is coupled to a shaft, which shaft is coupled to the turbine wheel. Thus as the exhaust from an internal combustion engines drives the turbine wheel, the rotational energy is translated through the shaft to the compressor wheel. As the compressor wheel turns, it draws air into the compressor through the inlet, through the blades or vanes of the compressor wheel, then forces the air out through the outlet.

The inner wall 62 of the shroud 60 defines a central channel 70. An annular channel 72 is defined between the outer surface 66 of the inner wall 62 and the inner surface 24 of the outer wall 22. The central channel 70 and the annular channel 72 form the inner portion 34 of the inlet. At least one port or bypass 80 runs through the inner wall 62, allowing communication between the annular channel 72 and the vanes of the compressor wheel. In one embodiment, the port or bypass comprises a series of apertures through the inner wall 62. However, slots or other methods of allowing flow through the inner wall could also be used.

Air enters the compressor through the outer portion 32 of the inlet 30. The air then passes through the central channel 70, into the compressor wheel 50, and is forced to the outlet 40. In a surge condition, when the volume of air entering the compressor exceeds the compressor's requirements, air also exits the compressor wheel through the port 80, and flows through the annular channel 72 back to the outer portion of inlet where the air re-enters the central channel. This bypass action allows the compressor to reach an equilibrium state.

In a choke condition, where the compressor's requirements exceed the volume of air entering the compressor, air enters the compressor through the outer portion of the inlet, where a portion passes through the central channel 70 and into the compressor wheel 50, and another portion passes through the annular channel 72 and directly into the vanes of the compressor wheel 50, with both portions then forced to the outlet 40. This bypass action allows greater flow into the compressor wheel.

An inner deflector 90 extends into the annular channel 72. The inner deflector is coupled to a wall of the annular channel 72. Preferably, the inner deflector is coupled to the outer surface 66 of the inner wall 62. However, the inner deflector can also be attached to the end portion of the inner wall 62, or can also be coupled to the inner surface 24 of the outer wall 22 within the annular channel 72, and thus within the inner portion 34 of the inlet. Preferably, the inner deflector is coupled by a force fit with a wall of the annular channel. The inner deflector 90 can also be fixedly attached to a wall of the annular channel or to the end of the inner wall 62. It will be appreciated by those skilled in the art that the inner deflector can be coupled by welding, soldering, or riveting the deflector to the coupling surface, or by any other mechanical or adhesive coupling method known in the art.

The inner deflector 90 extends radially into the annular channel, and a portion of the inner deflector also extends axially along the annular channel. In one embodiment, the inner deflector has a "J" shaped cross section, and is constructed of aluminum alloy, per IDM 4270, .063" thick, with the short leg 92 of the "J" coupled to the outer surface 66 of the inner wall 62, the arcuate portion 94 extending radially from the inner wall into the annular channel, and the longer leg 96 of the "J" extending axially along the annular channel toward the port 80. In another embodiment, shown in FIG. 2, the deflector is "L" shaped in cross section, with a lip 92' coupled to the outer surface 66 of the inner wall, a leg 94' extending radially into the annular channel, and a leg 96' extending axially along the annular channel toward the port 80. It will be appreciated that a variety of configurations may be used for the inner deflector, all providing a first surface substantially perpendicular to a wall of the annular channel, and extending radially into the annular channel, and a second surface, substantially parallel to a wall of the annular channel, and extending from an end of the first surface axially along the annular channel. It will be further appreciated that the deflector may be coupled by force fit, or by fixedly attaching to either wall of the annular channel, or any other attachment method known to those skilled in the art. In some embodiments, a third surface extends from an opposite end of the first surface, substantially parallel to and extending axially along the annular channel, and coupling the deflector to a wall of the annular channel.

The surfaces of the inner deflector which extend into the annular channel, both radially and axially, reflect sound waves back into the annular channel as they flow from the compressor wheel 50 toward the outer portion 32. The reflection of the sound waves increases the distance the waves must travel before exiting the compressor, and thereby possibly reaching an ear and being perceived as noise. As the distance traveled by the wave increases, its intensity decreases, and thus noise is reduced. Noise is further reducing as the sound waves interfere with each other, as adding two waves together can result in a totaling reduction of amplitude, with the waves in effect canceling each other out. It will be appreciated that noise emissions can be further reduced by the use of sound insulating or damping materials in the compressor, or by the use of secondary noise reduction devices such as an additional inner deflector, or a noise suppressor ring.

Figure 2:
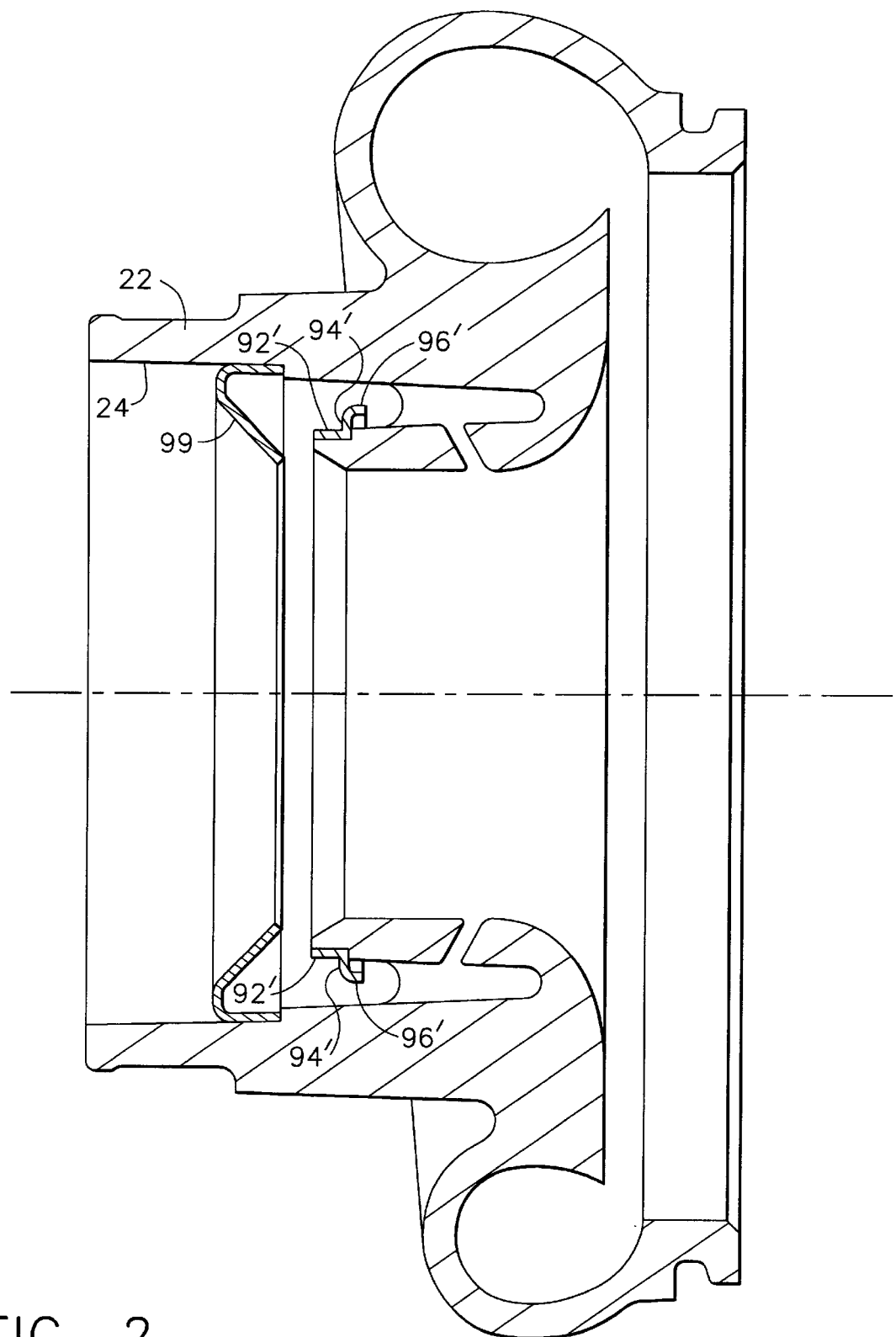
FIG. 2 is a cross-sectional elevation view of a ported shroud compressor in accordance with another embodiment of the present invention.

One embodiment of a noise suppressor ring 99 is shown in FIG. 2, where the annular ring is aligned axially with the annular channel of the compressor. The ring is attached to the inner surface 24 of the compressor wall 24, such that the outer diameter of the suppressor is greater than the outer diameter of the annular channel 72. The inner diameter of the noise suppressor 99 is less than the inner diameter of the annular channel 72. In this way, the noise suppressor blocks line-of-sight transmission of sound out of the annular channel, instead reflecting the sound waves and increasing the length of the path they must travel to exit the compressor. In one embodiment, the suppressor ring is attached to the inner surface by a frictional force fit, but it will be appreciated by those skilled in the art that the noise suppressor may be attached by mechanical or adhesive means, or by any other attachment method known to those skilled in the art. The shape of the noise suppressor may also be varied, so that its cross-section may appear as a C, a J, an L, a V or even a W, such that a portion of the noise suppressor extends radially inward from the inner surface 24 of the compressor outer wall 22 so that it is axially aligned with the annular channel 72.

Noise emissions may be further reduced through the use of sound insulating materials on the surfaces of the turbocharger. These materials absorb sound, reducing the sound that actually exits the compressor.

Although the invention has been described with reference to several specific embodiments, this description is not meant to be construed in a limiting sense. Various modifications of the disclosed embodiments as well as alternative embodiments of the invention will become apparent to one skilled in the art upon reference to the description of the invention. Furthermore, modifications may be made to the size, proportion, measurements and material of any of the various components and parts without departing from the spirit and scope of the invention. It is, therefore, to be understood that this invention may be practiced otherwise than as specifically described.

Having now described the invention in detail as required by the patent statutes, those skilled in the art will recognize modifications and substitutions to the specific embodiments disclosed herein. Such modifications and substitutions are within the scope and intent of the present invention as defined in the following claims.

What is claimed is:

1. A turbocharger having a bypass port compressor with a noise reduction device comprising:
    a compressor housing having an air inlet and a pressurized air outlet, the inlet having an outer portion and an inner portion, the inner portion having a central channel and an annular channel disposed concentrically around the central channel, with an inner radial wall disposed between the central and annular channel;
    a compressor wheel having a plurality of vanes, the wheel interposed between the inlet and the outlet; and
    an inner deflector disposed within the annular channel and having a first surface substantially perpendicular to a wall of the channel and extending radially into the channel, and having a second surface coupled to the first surface, and substantially parallel to a wall of the channel and extending axially along the channel, such that flow into and out of the annular channel of the inner portion of the inlet is partially obstructed;
    wherein the central channel and the annular channel of the inner portion of the inlet are each in communication with the compressor wheel.

2. A turbocharger as defined in claim 1 further comprising:
    a noise suppressor attached to the housing at the outer portion of the inlet, the noise suppressor having an outer diameter greater than the outer diameter of the annular channel of the inner portion of the inlet, and having an inner diameter less than the inner diameter of the annular channel of the inner portion of the inlet.

3. A turbocharger as defined in claim 2 further comprising:
    a channel in the inner radial wall that is in air-flow communication with the vanes of the compressor wheel and the annular channel.

4. A turbocharger as defined in claim 3 further comprising:
    a plurality of apertures in the inner radial wall that provide communication between the vanes of the compressor wheel and the annular channel.

5. A turbocharger as defined in claim 1 wherein:
    the inner deflector has a substantially "J" shaped cross section.

6. A turbocharger as defined in claim 1 wherein:
    the inner deflector has a substantially "L" shaped cross section.

7. A turbocharger as defined in claim 1 wherein:
    the first and second surfaces of the inner deflector are configured to prevent "line of sight" emission of sound waves from the annular channel.

8. A turbocharger as defined in claim 1 wherein:
    the inner deflector further comprises a third surface substantially parallel to and coupled with the annular channel.

9. A turbocharger as defined in claim 7 wherein:
    the first and second surfaces of the inner deflector are configured to dampen sound waves.

10. A turbocharger as defined in claim 7 wherein:
    the first and second surfaces of the inner deflector are configured to cancel sound waves.

11. A turbocharger as defined in claim 7 further comprising:
    sound insulating material in the annular channel.

12. A turbocharger as defined in claim 11 further comprising:
    sound insulating material in the inlet and outlet.

13. An inner deflector ring for use in a bypass port compressor having an axial inlet defining a central channel and an annular channel disposed concentrically therearound, a compressor wheel disposed within the compressor, and an aperture providing communication between compressor wheel and the annular channel, the inner deflector ring comprising:
    a first substantially radially extending surface, for obstructing flow along the annular channel, and
    a second substantially axially extending surface.

14. An inner deflector ring as defined in claim 13 further comprising:
    a third axially extending surface extending along the annular channel and separated from the first axially extending surface by the second radially extending surface, which is disposed therebetween.

15. A turbocharger system having a noise reduction device comprising:
    a bypass port compressor having a housing, a concentric inner radial wall and outer radial wall collectively defining the compressor inlet, the inner radial wall circumscribing a central channel, and an annular channel interposed between the outer radial wall and the inner radial wall, the annular channel being disposed concentrically around the central channel, a compressor outlet, a compressor wheel having a plurality of vanes, the wheel located between the inlet and outlet and in communication with both the central and annular channels; and an inner deflector disposed within the annular channel, having a first surface extending radially across the annular channel, and a second surface extending axially along the annular channel, to partially obstruct flow into and out of the annular channel.

16. A turbocharger system as defined in claim 15 further comprising:

a noise suppressor disposed within the compressor inlet, wherein the noise suppressor is coupled to an inner surface of the outer radial wall.

17. A turbocharger system as defined in claim 16 wherein:
the noise suppressor is cylindrical.

18. A turbocharger system as defined in claim 17 wherein:
the outer diameter of the noise suppressor is greater than the outer diameter of the annular channel.

19. A turbocharger system as defined in claim 17 wherein:
the inner diameter of the noise suppressor is less than the inner diameter of the annular channel.

20. A turbocharger system as defined in claim 15 wherein:
the noise suppressor is substantially "C" shaped in cross-section.

21. A turbocharger system as defined in claim 15 wherein:
the noise suppressor is substantially "J" shaped in cross-section.

22. A turbocharger system as defined in claim 15 wherein:
the noise suppressor is substantially "L" shaped in cross-section.

* * * * *